(12) United States Patent
Kohno

(10) Patent No.: US 9,052,223 B2
(45) Date of Patent: Jun. 9, 2015

(54) AIR FLOW QUANTITY MEASURING APPARATUS FOR INTERNAL COMBUSTION ENGINE

(75) Inventor: Yasushi Kohno, Obu (JP)

(73) Assignee: DENSO CORPORATION, Kariya (JP)

(*) Notice: Subject to any disclaimer, the term of this patent is extended or adjusted under 35 U.S.C. 154(b) by 780 days.

(21) Appl. No.: 13/242,349

(22) Filed: Sep. 23, 2011

(65) Prior Publication Data

US 2012/0079889 A1  Apr. 5, 2012

(30) Foreign Application Priority Data

Sep. 30, 2010  (JP) ................................ 2010-221240

(51) Int. Cl.
| | | |
|---|---|---|
| *G01F 1/684* | (2006.01) | |
| *F02D 41/00* | (2006.01) | |
| *G01F 1/696* | (2006.01) | |
| *G01F 5/00* | (2006.01) | |
| *F02D 41/18* | (2006.01) | |

(52) U.S. Cl.
CPC .......... *G01F 1/6842* (2013.01); *F02D 41/0002* (2013.01); *F02D 41/18* (2013.01); *F02D 2200/0408* (2013.01); *G01F 1/6965* (2013.01); *G01F 5/00* (2013.01); *Y02T 10/42* (2013.01)

(58) Field of Classification Search
CPC ......... G01F 1/00; G01F 1/34; G01F 25/0007; G01F 23/70; F02D 41/0002; F02D 41/0045; F02D 41/0075; F02D 2009/0286
USPC .............................................. 702/45; 73/861
See application file for complete search history.

(56) References Cited

U.S. PATENT DOCUMENTS

| | | | | |
|---|---|---|---|---|
| 4,409,929 A * | 10/1983 | Sasaki et al. | ................... | 123/479 |
| 4,416,240 A * | 11/1983 | Matsuoka | ...................... | 123/493 |
| 6,220,090 B1 * | 4/2001 | Kohno et al. | .................... | 73/202 |
| 6,904,793 B2 * | 6/2005 | Kanke et al. | ............... | 73/114.34 |
| 6,955,080 B1 * | 10/2005 | Verdejo | ....................... | 73/114.32 |
| 7,151,994 B2 * | 12/2006 | Fuwa | ............................ | 701/114 |
| 8,365,702 B2 * | 2/2013 | Elsasser et al. | ............... | 123/429 |
| 2003/0172731 A1 * | 9/2003 | Kohno et al. | ............... | 73/204.22 |
| 2005/0028515 A1 * | 2/2005 | Fukuma et al. | ................. | 60/276 |
| 2009/0101121 A1 * | 4/2009 | Okamura | ...................... | 123/564 |

FOREIGN PATENT DOCUMENTS

| | | |
|---|---|---|
| JP | 55-164312 | 12/1980 |
| JP | 11-257137 | 9/1999 |

(Continued)

OTHER PUBLICATIONS

Japanese Official Action dated Oct. 23, 2012 issued in corresponding Japanese Application No. 2010-221240, with English translation.

*Primary Examiner* — John Breene
*Assistant Examiner* — Lynda Dinh
(74) *Attorney, Agent, or Firm* — Nixon & Vanderhye P.C.

(57) ABSTRACT

A flow meter outputs a frequency signal, which corresponds to an air flow quantity of intake air to be supplied to an engine. In an engine control unit, when a sensed value of the air flow quantity, which is obtained based on the frequency signal, is within an estimated air flow quantity range, which is estimated based on an operational state of the engine, the sensed value of the air flow quantity is determined as a measurement value of the flow meter. In contrast, when the sensed value of the air flow quantity is out of the estimated air flow quantity range, a median of the estimated air flow quantity range is determined as the measurement value of the flow meter.

7 Claims, 8 Drawing Sheets

(56) References Cited

FOREIGN PATENT DOCUMENTS

| JP | 2000-97101 | 4/2000 |
| JP | 2002-181604 | 6/2002 |
| JP | P2003-182140 A | 7/2003 |
| JP | P2006-275541 A | 10/2006 |
| JP | 2009-186417 | 8/2009 |

* cited by examiner

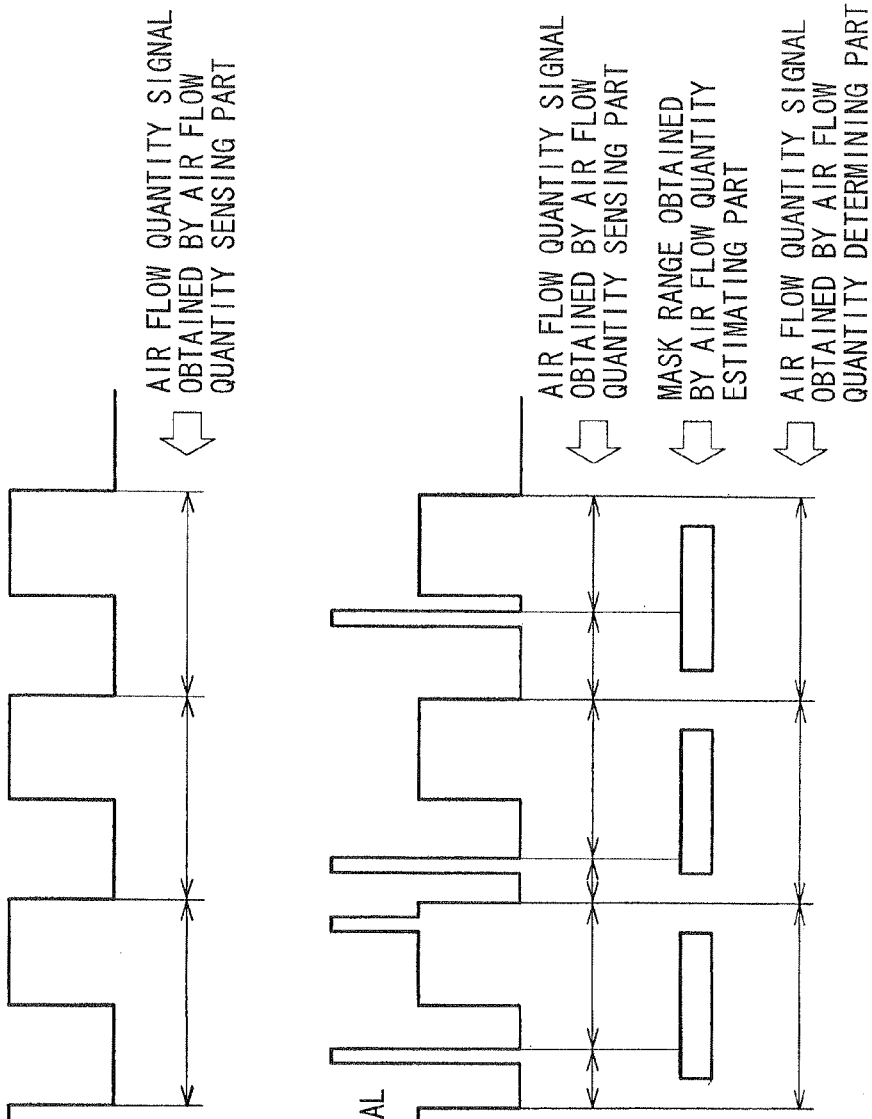

NORMAL TIME

ABNORMAL TIME

US 9,052,223 B2

AIR FLOW QUANTITY MEASURING APPARATUS FOR INTERNAL COMBUSTION ENGINE

CROSS REFERENCE TO RELATED APPLICATION

This application is based on and incorporates herein by reference Japanese Patent Application No. 2010-221240 filed on Sep. 30, 2010.

BACKGROUND OF THE INVENTION

1. Field of the Invention

The present invention relates to an air flow quantity measuring apparatus for an internal combustion engine.

2. Description of Related Art

For example, with reference to FIGS. 8A and 8B, Japanese Unexamined Patent Publication JP2009-186417A teaches an air flow quantity measuring apparatus, which includes an air flow meter 101 and an engine control unit (ECU) 102. The air flow meter 101 includes a control circuit 101a and a frequency converter circuit 101b. The control circuit 101a outputs an electrical signal (an electrical signal of a resistance value or voltage value), which corresponds to a sensed value of an air flow quantity of intake air to be supplied to a combustion chamber of an internal combustion engine (hereinafter also simply referred to as an engine) of a vehicle (e.g., an automobile). The frequency converter circuit 101b converts the electrical signal, which is received from the control circuit 101a, into a pulse frequency signal and outputs the pulse frequency signal to the ECU 102. The ECU 102 includes a microcomputer 102a (implementing functions of an edge sensing means for sequentially sensing generation of a falling edge of the pulse frequency signal, a time data storage means for sequentially storing a time data record indicating a time point of generating the falling edge, an edge interval sensing means for sensing an interval time period between the time points, an average period sensing means for sensing an average period of the pulse frequency signal and an air flow quantity sensing means for computing the air flow quantity based on the average period of the pulse frequency signal) to compute the air flow quantity based on the pulse frequency signal, which is outputted from the air flow meter 101.

In the air flow quantity measuring apparatus described above, the period (duration of one cycle) of the pulse frequency signal, which is outputted from the air flow meter 101, is converted into the air flow quantity by the ECU 102 (more specifically the microcomputer), and this air flow quantity is used as a measurement value of the air flow meter 101. In this way, a conversion time period, which is required to convert the pulse frequency signal into the air flow quantity, can be shortened.

However, in the vehicle (e.g., the automobile), the electromagnetic interference (EMI) occurs on the ECU.

In the case where the ECU 102 of Japanese Unexamined Patent Publication JP2009-186417A is under the influence of the EMI, a noise (hereinafter referred to as an EMI noise) overlaps with the frequency signal, which is outputted from the air flow meter 101.

In such a case, the ECU 102 may erroneously converts the pulse frequency signal into the air flow quantity or may erroneously compute the air flow quantity from the pulse frequency signal. That is, when the EMI noise overlaps with the frequency signal, a sensing error of the air flow quantity becomes large, so that an accuracy and reliability of the measurement value of the air flow meter 101 may possibly be deteriorated.

SUMMARY OF THE INVENTION

The present invention addresses the above disadvantages. According to the present invention, there is provided an air flow quantity measuring apparatus for an internal combustion engine, including a flow meter, an air flow quantity sensing means, an air flow quantity estimating means and an air flow quantity determining means. The flow meter outputs a frequency signal, which corresponds to an air flow quantity of intake air to be supplied to the internal combustion engine. The air flow quantity sensing means is for sensing the frequency signal and for outputting a sensed value of the air flow quantity based on the frequency signal. The air flow quantity estimating means is for estimating an air flow quantity range based on an operational state of the internal combustion engine and for outputting an estimated value of the air flow quantity, which is within the estimated air flow quantity range. The air flow quantity determining means is for determining a measurement value of the flow meter. The flow quantity determining means determines the sensed value of the air flow quantity as the measurement value of the flow meter when the sensed value of the air flow quantity is within the estimated air flow quantity range. The flow quantity determining means determines the estimated value of the air flow quantity as the measurement value of the flow meter when the sensed value of the air flow quantity is out of the estimated air flow quantity range.

BRIEF DESCRIPTION OF THE DRAWINGS

The invention, together with additional objectives, features and advantages thereof, will be best understood from the following description, the appended claims and the accompanying drawings in which:

FIG. 6A is a timing chart showing a frequency signal of the air flow meter and an air flow quantity signal obtained by an air flow quantity sensing part during the normal time according to the embodiment;

FIG. 6B is a timing chart showing a frequency signal of the air flow meter, masks obtained by a flow quantity estimating part, and an air flow quantity signal obtained by the air flow quantity sensing part during the abnormal time according to the embodiment;

DETAILED DESCRIPTION OF THE INVENTION

Figure 1:
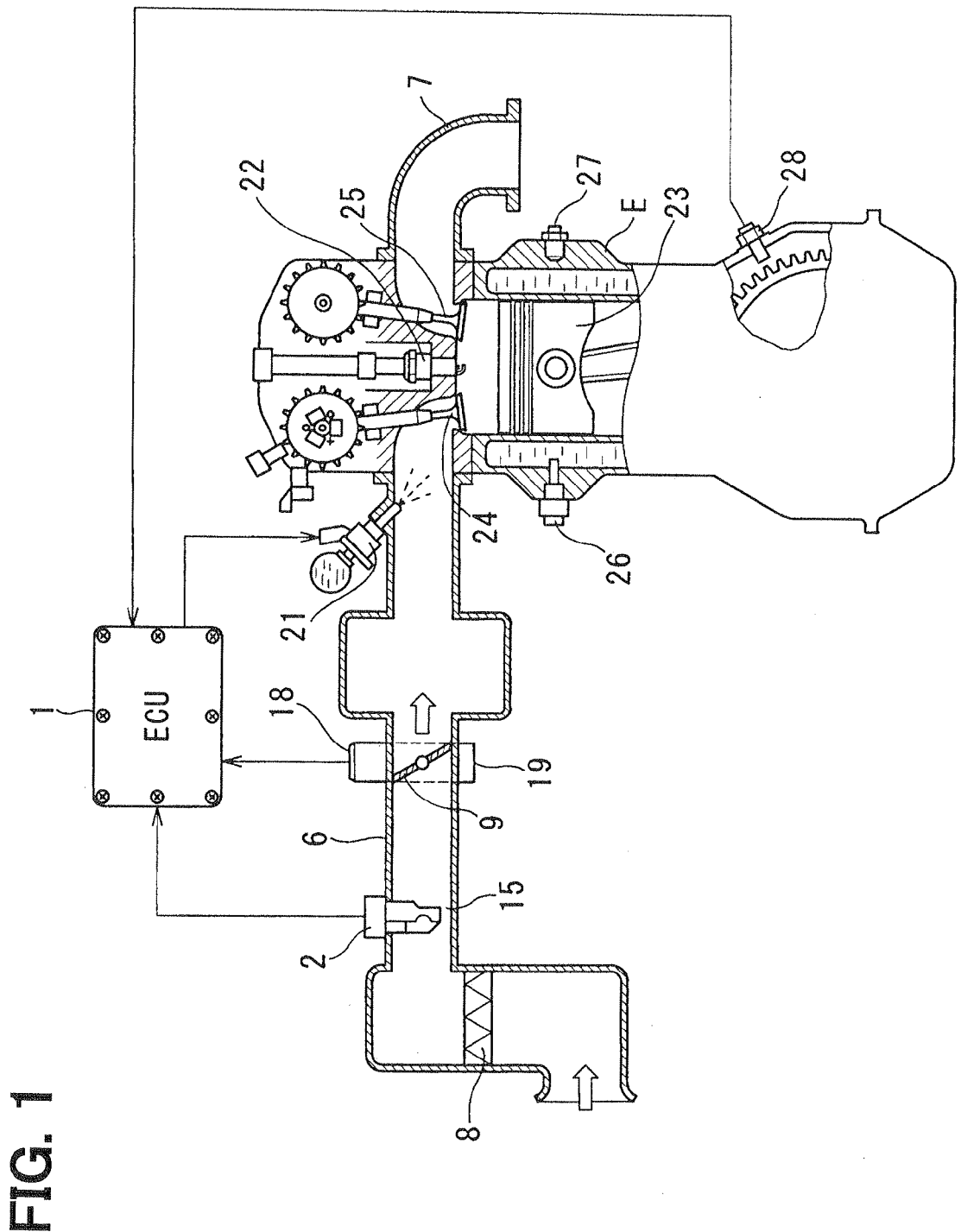
FIG. 1 is a schematic diagram showing a structure of an engine control system according to an embodiment of the present invention.
Figure 2:
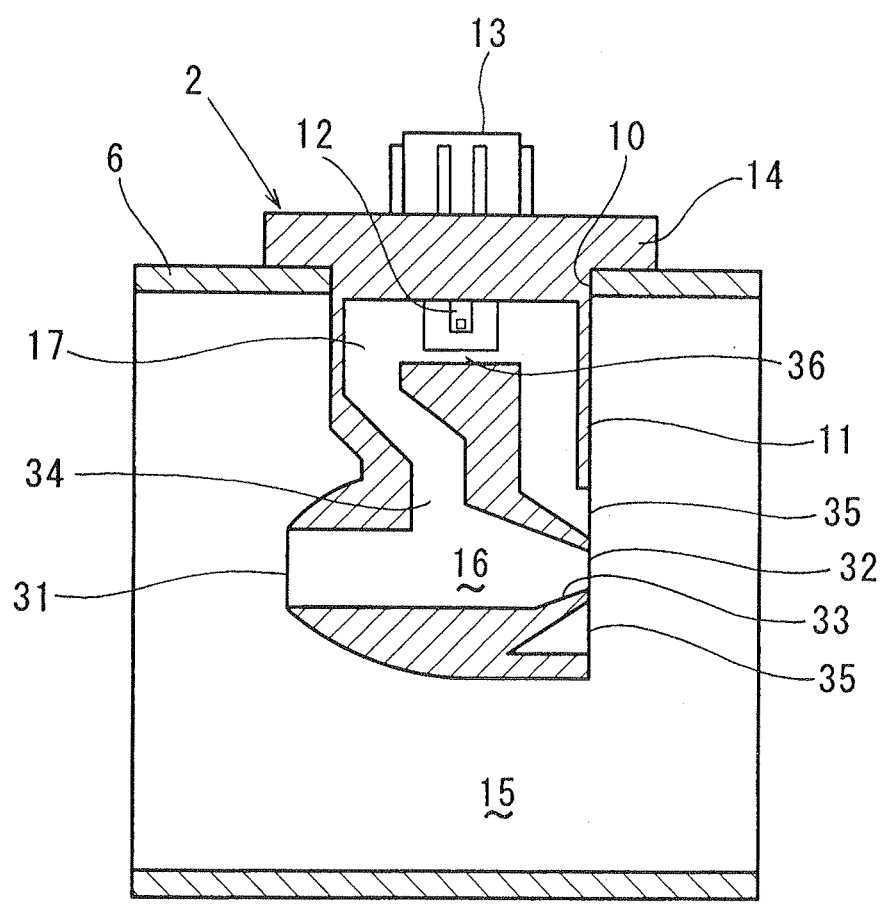
FIG. 2 is a cross-sectional view showing an air flow meter of the embodiment.

An embodiment of the present invention will be described with reference to the accompanying drawings.

A control system (engine control system) of an internal combustion engine E of the present embodiment includes an air flow quantity measuring apparatus (an air flow quantity computing apparatus of the internal combustion engine), which measures (computes) the quantity (the air flow quantity) of the intake air, which is supplied to the engine E.

The air flow quantity measuring apparatus includes an engine control unit (ECU) 1, which is also referred to as an engine control device, and a thermal air flow meter (AFM) 2. The ECU 1 executes various engine control operations. The air flow meter 2 outputs a pulse frequency signal to a microcomputer of the ECU 1.

The ECU 1 has the microcomputer of a known type, which includes, for example, a CPU, memory devices (e.g., a ROM and a RAM) and a timer. The CUP executes control operations and computing operations. The storage devices store control programs and/or control logics as well as various types of data.

The ECU 1, particularly, the microcomputer of the ECU 1 includes an air flow quantity sensing part 3, an air flow quantity (range) estimating part 4 and an air flow quantity determining part 5. The air flow quantity sensing part 3 serves as an air flow quantity sensing means. Specifically, the air flow quantity sensing part 3 senses a period (duration of one cycle) of the pulse frequency signal outputted from the air flow meter 2 and outputs an air flow quantity signal (a sensed value of the air flow quantity). The air flow quantity (range) estimating part 4 serves as an air flow quantity (range) estimating means. Specifically, the air flow quantity estimating part 4 estimates the air flow quantity signal (an estimated air flow quantity range, an estimated value of the air flow quantity) based on an operational state (e.g., an engine load) of the engine E. The air flow quantity determining part 5 determines the air flow quantity signal (a measurement value of the air flow meter 2), which is used in the various engine control operations (e.g., a fuel injection control operation, an air-fuel ratio control operation), based on the air flow quantity signals, which are outputted from the air flow quantity sensing part 3 and the air flow quantity estimating part 4, respectively. Details of the ECU 1 will be described later.

In the present embodiment, the engine is a multi-cylinder gasoline engine having a plurality of cylinders. The engine E generates its output from a heat energy that is obtained through combustion of an air-fuel mixture gas, which includes external air (intake air) filtered through an air cleaner and fuel, in a combustion chamber.

An intake pipe 6 is connected to intake ports of the cylinders of the engine E. An intake passage is formed in an inside of the intake pipe 6 to supply the intake air to the combustion chamber of each cylinder of the engine E. Furthermore, an exhaust pipe 7 is connected to exhaust ports of the cylinders of the engine E. An exhaust passage is formed in an inside of the exhaust pipe 7 to externally output the exhaust gas, which is discharged from the combustion chambers of the cylinders of the engine E, through an exhaust gas purifying apparatus (a catalytic converter, such as a three-way catalytic converter).

An air filter 8 of the air cleaner, the air flow meter 2 of the air flow quantity measuring apparatus, a throttle valve 9 of an electronic throttle apparatus and an intake manifold are placed in the intake pipe 6. An exhaust manifold and an exhaust gas sensor (an air-fuel ratio sensor, an oxygen concentration sensor) are placed in the exhaust pipe 7.

The air flow meter 2 of the present embodiment is the thermal air flow meter, which measures a quantity of the intake air (intake air quantity) based on a quantity of heat release, which is released from a heating resistor (particularly a hot wire).

The air flow meter 2 includes a hollow housing 11, a sensing device 12 and a controller 22. The housing 11 is detachably installed to an installation hole 10, which is formed at a predetermined location of the intake pipe 6. The sensing device 12 is placed in an inside of the housing 11. The controller 22 is electrically connected to the ECU 1 through a connector 13.

The housing 11 is a sensor body made of a synthetic resin material and includes a flange 14. Two bypass flow passages 16, 17 are formed in the inside of the housing 11 to conduct a portion of the intake air that flows in the intake passage (e.g., a main flow passage 15) of the intake pipe 6. Details of the air flow meter 2 will be described later.

The electronic throttle apparatus of the present embodiment includes a throttle body, a throttle valve 9, an electric actuator and a throttle opening degree sensor 18.

The throttle body is placed in the intake pipe 6 of the engine E at, for example, an inlet of a surge tank.

The throttle valve 9 is a butterfly valve that controls (adjusts) the air flow quantity of the intake air, which flows in the inside (intake passage) of the intake pipe 6. The throttle valve 9 is fixed to and is supported by a shaft (rotatable shaft), which is, in turn, rotatably installed to the intake pipe 6. The electric actuator is installed to the throttle body, which is a part of the intake pipe 6. The electric actuator drives the shaft, which securely supports the throttle valve 9, in a valve opening direction or a valve closing direction of the throttle valve 9. The electric actuator includes an electric motor 19, which generates a drive force (torque) to drive the throttle valve 9 when an electric power is supplied to the electric motor 19.

The electric motor 19, which drives the throttle valve 9, is electrically connected to a battery of a vehicle (e.g., an automobile) through a motor drive circuit, which is electronically controlled by the ECU 1.

An injector 21, which injects fuel into the combustion chamber or the intake port, and a spark plug 22, which ignites the air-fuel mixture gas in the combustion chamber, are provided to each cylinder of the engine E. A piston 23, which is connected to a crankshaft through a connecting rod, is slidably supported in a cylinder bore of each cylinder. Intake valves 24, each of which opens or closes the intake port of the corresponding cylinder, and exhaust valves 25, each of which opens or closes the exhaust port of the corresponding cylinder, are installed to the engine E.

Furthermore, a coolant temperature sensor 26, a knock sensor 27 and a crank angle sensor 28 are installed to the engine E.

Next, details of the air flow meter 2 of the present embodiment will be described with reference to FIGS. 1 to 6B.

The air flow meter 2 is of a plug-in type and is thereby detachably installed to the installation hole 10 of the intake pipe 6. As discussed above, the air flow meter 2 includes the housing 11, the sensing device 12 and the controller 22.

The housing 11 is inserted from the outside of the intake pipe 6 into the inside of the intake pipe 6 through the installation hole 10 such that the housing 11 projects into the main flow passage 15. The flange 14 is provided at an upper portion of the housing 11, which is located at an upper side in a height direction (top-to-bottom direction in FIG. 2) of the housing 11. The flange 14 is securely fastened to a peripheral edge portion (outer wall surface) of the installation hole 10 of the intake pipe 6 through fastener screws (not shown).

The bypass flow passages 16, 17 are formed in the inside of the housing 11. Specifically, the bypass flow passage 16 is configured into an I-shape such that the bypass flow passage 16 bypasses the main flow passage 15 of the intake pipe 6 and is generally parallel to the flow direction of the air in the main flow passage 15 of the intake pipe 6. The bypass flow passage 17 is configured into a U-shape such that the bypass flow passage 17 bypasses the main flow passage 15 of the intake pipe 6 and receives a portion of the air flow, which flows in the bypass flow passage 16.

An inlet 31 is formed in an upstream end of the bypass flow passage 16 to receive the intake air from the main flow passage 15 of the intake pipe 6. An outlet 32 is formed in a downstream end of the bypass flow passage 16 to output the intake air to the main flow passage 15 of the intake pipe 6. A choked section 33 is formed in the bypass flow passage 16 at an outlet 32 side of the bypass flow passage 16 and is tapered such that a flow passage cross-sectional area of the choked section 33 progressively decreases toward the outlet 32 of the bypass flow passage 16.

The bypass flow passage 17 includes an inlet 34 and an outlet 35. The inlet 34 is branched from the bypass flow passage 16 at a location, which is located on an upstream side of the choked section 33 in the bypass flow passage 16 in the flow direction of the intake air. The outlet 35 is formed around the outlet 32 of the bypass flow passage 16 such that the outlet 35 concentrically surrounds the outlet 32 of the bypass flow passage 16. A U-turn passage section is formed between the inlet 34 and the outlet 35 in the bypass flow passage 17 such that a flow direction of the intake air is changed by 180 degrees (making U-turn) in the U-turn passage section. A linear passage part (horizontal passage part) 36 is formed in a center part of the U-turn passage section, and the sensing device 12 is placed in the linear passage part 36.

The sensing device 12 is received in the inside of the housing 11. The sensing device 12 includes a sensor chip that has a thin film portion (also referred to as a diaphragm, membrane or thin wall portion). The sensor chip includes a planar circuit board, which is made of silicon. A heat generating resistor and four temperature sensing resistors (i.e., first to fourth temperature sensing resistors) are formed on a surface of the circuit board in a predetermined pattern.

The heat generating resistor, which generates a heat upon receiving an electric power, is placed at a center of the thin film portion of the sensor chip. A value of the resistance of each of the first to fourth temperature sensing resistors changes depending on the temperature around the temperature sensing resistor. The first and fourth temperature sensing resistors are placed on a downstream side of the heat generating resistor in the flow direction of the air (intake air flow direction), and the second and third temperature sensing resistors are placed on an upstream side of the heat generating resistor in the flow direction of the air. The first to fourth temperature sensing resistors form a part of a flow quantity sensing unit 12a.

The first temperature sensing resistor and the second temperature sensing resistor are connected in series to form a series circuit, and the third temperature sensing resistor and the fourth temperature sensing resistor are connected in series to form a series circuit. The series circuit of the first and second temperature sensing resistors is connected in parallel to the series circuit of the third and fourth temperature sensing resistors to form an air flow quantity sensing bridge circuit (first bridge circuit).

The first temperature sensing resistor is placed on the downstream side of the heat generating resistor in the flow direction of the air, and the second temperature sensing resistor is placed on the upstream side of the heat generating resistor in the flow direction of the air. The third temperature sensing resistor is placed on the upstream side of the second temperature sensing resistor in the flow direction of the air, and the fourth temperature sensing resistor is placed on the downstream side of the first temperature sensing resistor in the flow direction of the air.

A predetermined supply voltage (power source voltage) is applied to a midpoint connection between the first temperature sensing resistor and the third temperature sensing resistor. An electric potential of a midpoint connection between the second temperature sensing resistor and the fourth temperature sensing resistor is a ground (GND) electric potential.

The flow quantity sensing unit 12a further includes a differential amplifier (operational amplifier) besides the first bridge circuit. The flow quantity sensing unit 12a obtains a bridge output voltage of the first bridge circuit (i.e., a difference between the electric potential of the midpoint connection between the first temperature sensing resistor and the second temperature sensing resistor and the electric potential of the midpoint connection between the third temperature sensing resistor and the fourth temperature sensing resistor). Then, the obtained bridge output voltage, i.e., the obtained potential difference is amplified by the amplifier and is outputted to a voltage-to-frequency converter (also simply referred to as a frequency converter) 22b of the controller 22 as an air flow quantity voltage signal.

The controller 22 further includes a heater temperature control circuit (a drive circuit of the heat generating resistor) 22a besides the voltage-to-frequency converter 22b. The heater temperature control circuit 22a controls the heating temperature of the heat generating resistor. The voltage-to-frequency converter 22b converts the air flow quantity voltage signal, which is outputted from the first bridge circuit of the flow quantity sensing unit 12a, into a pulse frequency signal through frequency conversion.

The heater temperature control circuit 22a forms a heater temperature control bridge circuit (second bridge circuit). In the heater temperature control bridge circuit, a first fixed resistor and a temperature sensing resistor form a series circuit, and a second fixed resistor and an indirectly heated resistor form a series circuit. The series circuit of the first fixed resistor and the temperature sensing resistor is connected in parallel to the series circuit of the second fixed resistor and the indirectly heated resistor. A predetermined supply voltage (power source voltage) is applied to a midpoint connection between the first fixed resistor and the second fixed resistor. An electric potential of a midpoint connection between the temperature sensing resistor and the indirectly heated resistor is a ground (GND) electric potential.

The heater temperature control circuit 22a further includes a differential amplifier (operational amplifier) and a transistor besides the second bridge circuit. The heater temperature control circuit 22a variably controls the electric power supplied to the heat generating resistor based on the temperature of the intake air (intake air temperature) that is sensed with the temperature sensing resistor, so that the indirectly heated resistor has a higher temperature, which is higher than the intake air temperature that is sensed with the temperature sensing resistor of the second bridge circuit.

Specifically, the drive voltage of the heat generating resistor is generated through the transistor, which is driven upon receiving a constant voltage, and the bridge output voltage of the first bridge circuit (the electric potential between the midpoint connections) is obtained through the differential amplifier. Thereafter, the transistor is feedback controlled to variably control the drive voltage of the heat generating resistor such that this bridge output voltage becomes a predetermined voltage value (e.g., 0 V). The feedback control of the transistor through the differential amplifier results in that the temperature of the heat generating resistor becomes higher than the intake air temperature, which is sensed with the temperature sensing resistor, by a predetermined amount (predetermined temperature).

Figure 3:
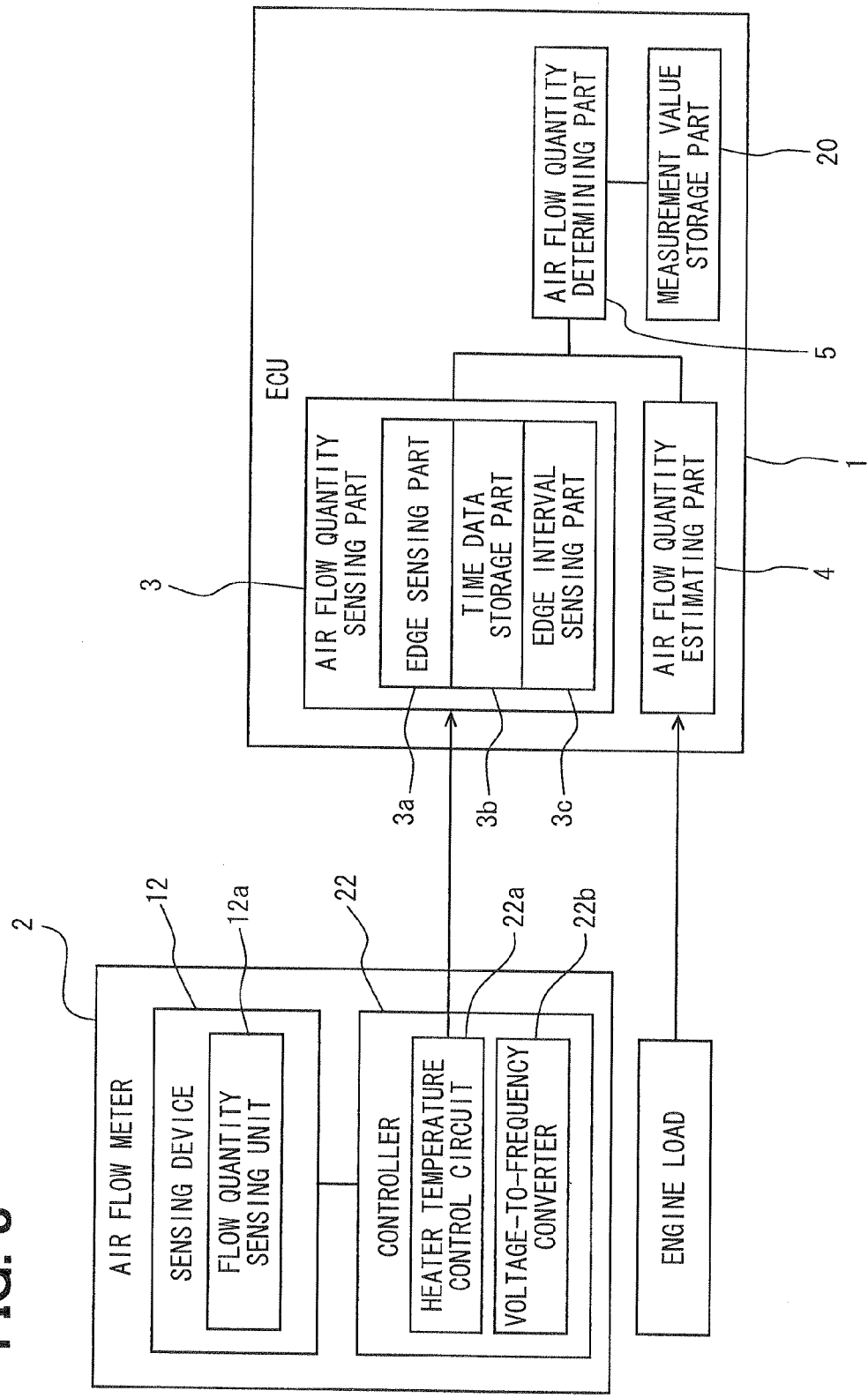
FIG. 3 is a block diagram showing an air flow quantity measuring apparatus of the embodiment.

The voltage-to-frequency converter 22b converts the air flow quantity voltage signal, which is received from the flow quantity sensing unit 12a, into the pulse frequency signal as shown in FIGS. 3, 6A and 6B through the frequency conversion, and this pulse frequency signal is then outputted to the ECU 1.

Next, details of the ECU 1 of the present embodiment will be described with reference to FIGS. 1 to 6B.

The ECU 1 is configured such that the pulse frequency signal, which is outputted from the controller 22 of the air flow meter 2, is supplied to the microcomputer of the ECU 1. The ECU 1 is configured such that the microcomputer of the ECU 1 receives the sensor output signals from an accelerator pedal position sensor (accelerator opening degree sensor), an engine torque sensor, the throttle opening degree sensor 18, the coolant temperature sensor 26, the knock sensor 27 and the crank angle sensor 28 after analogue-to-digital (A/D) conversion of the sensor output signals through an A/D converter circuit.

The accelerator pedal position sensor serves as an engine load sensing means and senses the amount of depression of the accelerator pedal (accelerator opening degree), which is depressed by the driver of the vehicle.

The engine torque sensor serves as an engine torque sensing means (engine load sensing means) and senses a torque (an output shaft torque, i.e., an engine shaft torque) of the engine E.

The throttle opening degree sensor 18 serves as a throttle opening degree sensing means (engine load sensing means) and senses a throttle opening degree that is a valve opening degree of the throttle valve 9, which is changed based on the sensor output signal (the accelerator pedal position signal also referred to as the accelerator opening degree signal) outputted from the accelerator pedal position sensor.

The crank angle sensor 28 serves as a crank angle sensing means and senses a rotational angle of the crankshaft of the engine E. The crank angle sensor 28 includes a pickup coil, which converts the rotational angle of the crankshaft of the engine E into an electrical signal. The crank angle sensor 28 outputs an engine speed pulse signal (NE pulse signal) at, for instance, every 30 degrees crank angle (CA). The ECU 1 has a function of a rotational speed sensing means (engine load sensing means) and senses the engine rotational speed (the number of revolutions of the engine per unit time) by measuring an interval time period between the NE pulse signals outputted from the crank angle sensor 28.

Furthermore, as shown in FIG. 3, the microcomputer of the ECU 1 includes the air flow quantity sensing part (air flow quantity sensing means) 3, the air flow quantity estimating part (air flow quantity estimating means) 4 and the air flow quantity determining part (air flow quantity determining means) 5.

The air flow quantity sensing part (air flow quantity sensing means) 3 senses a period (duration of one cycle) of the pulse frequency signal outputted from the controller 22 of the air flow meter 2 and converts the sensed period of the pulse frequency signal into a corresponding air flow quantity signal (sensed value of the air flow quantity). Then, the air flow quantity sensing part 3 outputs the air flow quantity signal.

The air flow quantity estimating part 4 estimates an air flow quantity range, which can be estimated based on the operational state of the engine E (e.g., the engine load). Then, the air flow quantity estimating part 4 outputs an air flow quantity signal (the estimated value of the air flow quantity), which is within the estimated air flow quantity range.

When the air flow quantity signal (the sensed value of the air flow quantity), which is outputted from the air flow quantity sensing part 3, falls in the estimated air flow quantity range, which is estimated by the air flow quantity estimating part 4, the air flow quantity determining part 5 determines the air flow quantity signal (the sensed value of the air flow quantity), which is sensed by the air flow quantity sensing part 3, as the measurement value of the air flow meter 2. In contrast, when the air flow quantity signal (the sensed value of the air flow quantity), which is outputted from the air flow quantity sensing part 3, is out of the estimated air flow quantity range, which is estimated by the air flow quantity estimating part 4, the air flow quantity determining part 5 determines the air flow quantity signal (the estimated value of the air flow quantity), which is estimated by the air flow quantity estimating part 4, as the measurement value of the air flow meter 2.

Thereafter, the ECU 1 computes a fuel injection quantity of the injector 21 based on the measurement value of the air flow meter 2, which is determined by the air flow quantity determining part 5. Then, the ECU 1 variably controls an energization time period (valve open time period) of the injector 21 based on the computed fuel injection quantity. Also, the ECU 1 controls the energization time period of the injector 21 in association with the various systems/apparatuses, such as the electronic throttle apparatus, the fuel supply apparatus (fuel injection device) and the ignition apparatus.

Figure 4:
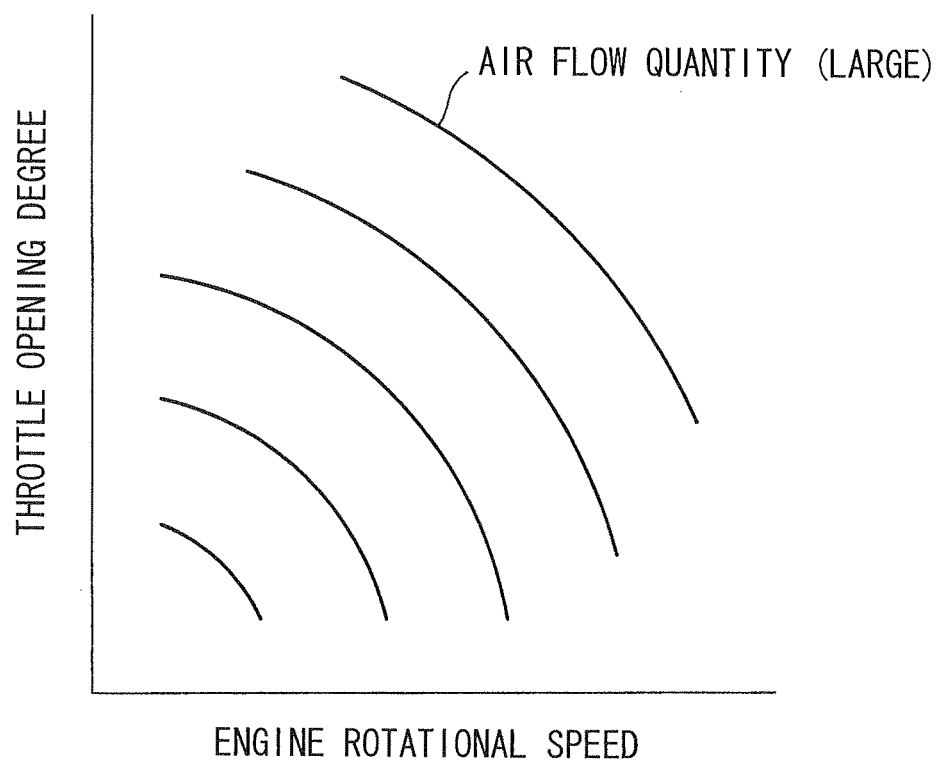
FIG. 4 is a diagram showing a relationship between an engine load (an engine rotational speed and a throttle opening degree) and a median (an estimated value of the air flow quantity) of an air flow quantity range according to the embodiment.
Figure 5:
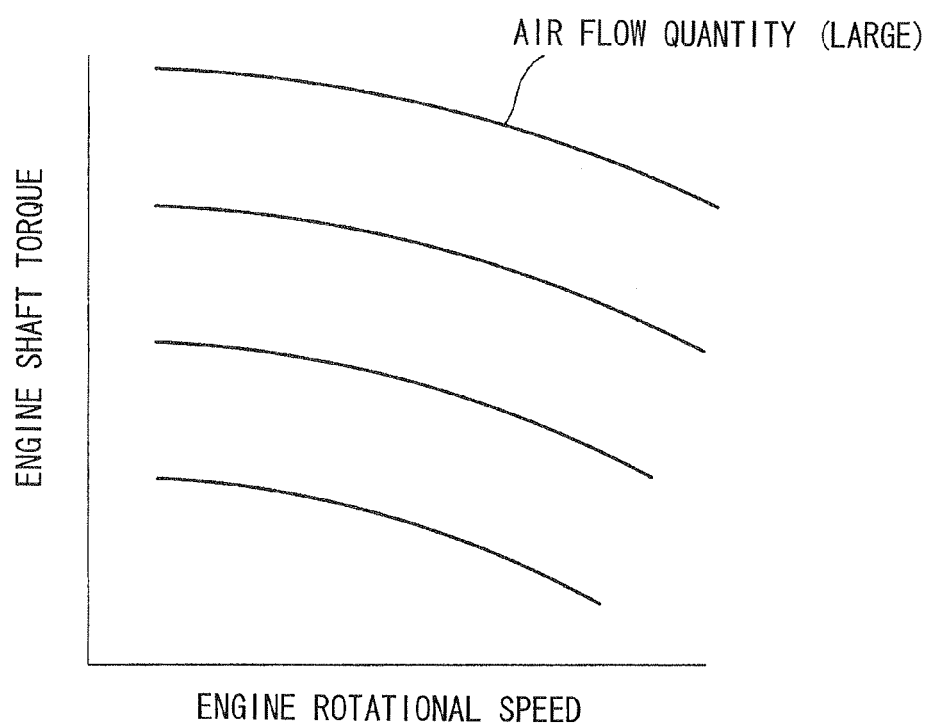
FIG. 5 is a diagram showing a relationship between an engine load (an engine rotational speed and an engine shaft torque) and a median (an estimated value of the air flow quantity) of an air flow quantity range according to the embodiment.

Next, an air flow quantity computing method of the ECU 1 of the present embodiment will be described with reference to FIGS. 1 to 6B. FIG. 4 is a diagram showing a relationship among the engine rotational speed, the throttle opening degree and the air flow quantity signal (an estimated value of the air flow quantity). FIG. 5 is a diagram showing a relationship among the engine rotational speed, the engine shaft torque and the air flow quantity signal (the estimated value of the air flow quantity).

When an ignition switch of the vehicle is turned on (IG ON), the pulse frequency signal of the air flow meter 2 and the sensor output signals of the throttle opening degree sensor 18, the crank angle sensor 28 and the engine torque sensor are repeatedly obtained for each predetermined sampling interval.

Then, the air flow quantity sensing part 3 executes an air flow quantity sensing process. Specifically, the air flow quantity sensing part 3 senses the period (duration of one cycle) of the pulse frequency signal, which is outputted from the controller 22 of the air flow meter 2, and the air flow quantity sensing part 3 computes the air flow quantity signal (the sensed value of the air flow quantity) based on the period of the sensed pulse frequency signal.

Here, the air flow quantity sensing part 3 of the present embodiment includes an edge sensing part (edge sensing means) 3a. The edge sensing part 3a sequentially senses every falling edge of the pulse frequency signal, which is outputted from the controller 22 of the air flow meter 2, during the sampling period.

The air flow quantity sensing part 3 further includes a time data storage part (time data storage means) 3b. During the sampling period, the time data storage part 3b sequentially stores every time data record, which indicates the time (time point) of generating the corresponding falling edge of the pulse frequency signal, in an edge generating time register. An internal clock of the ECU 1 is synchronized with the edge generating time register, so that every time data record, which indicates the time of generating the corresponding falling edge of the pulse frequency signal, is stored by the time data storage part 3b during the sampling period.

Furthermore, the air flow quantity sensing part 3 also includes an edge interval sensing part (edge interval sensing means) 3c. At every sampling timing, the edge interval sensing part 3c uses the internal clock and therewith measures an interval time period (interval time length) between every adjacent two of the edge generating time points of the falling edges of the pulse frequency signal (i.e., the interval time period between each adjacent two of the time data records), which are stored in the edge generating time register. In this way, the edge interval sensing part 3c senses each edge-to-edge interval time period (i.e., the interval time period from one falling edge to the subsequent falling edge) of the pulse frequency signal recorded during the sampling period.

Furthermore, the air flow quantity sensing part 3 also includes an undepicted average period sensing part (average period sensing means), which senses an average period (average duration of one cycle) of the pulse frequency signal in the sampling period based on the edge-to-edge interval time periods of the pulse frequency signal obtained, i.e., stored during the sampling period. The average period sensing part uses the internal clock and therewith senses the average period of the pulse frequency signal in the sampling period based on the sensed edge-to-edge interval time periods of the pulse frequency signal obtained, i.e., stored during the sampling period.

Then, the air flow quantity sensing part 3 converts the average period of the pulse frequency signal of the sampling period into the corresponding air flow quantity signal (the sensed value of the air flow quantity) and outputs the thus obtained air flow quantity signal to the air flow quantity determining part 5.

Next, the air flow quantity estimating part 4 executes an air flow quantity estimating process to estimate the air flow quantity signal (the estimated value of the air flow quantity) based on the operational state (e.g., the engine load) of the engine E.

Here, the engine load may be indicated by the engine rotational speed and the throttle opening degree. Alternatively, the engine load may be indicated by the engine rotational speed and the engine shaft torque (output shaft torque of the engine E).

In general, a frequency of a pressure pulsation of the intake air changes depending on the engine rotational speed.

Furthermore, in general, when the engine rotational speed is reduced, the pressure pulsation of the intake air is increased to cause an increase in the amount of change in the air flow quantity (an increase in a size of the air flow quantity range). In other words, when the engine rotational speed is low, the pressure pulsation of the intake air is large, so that the amount of change in the air flow quantity (the size of the air flow quantity range) becomes large, and vice versa. Also, in general, when the engine load is increased to cause an increase in the air flow quantity, the pressure pulsation of the intake air is increased to cause an increase in the amount of change in the air flow quantity. The increasing of the amount of change in the air flow quantity means the increasing of the difference (the amount change) between the maximum value and the minimum value of the air flow quantity range, which can be estimated based on the engine load.

Here, the memory of the microcomputer of the ECU 1 includes a table storage part (table storage means) that stores "an engine rotational speed/throttle opening degree to air flow quantity characteristic table", which indicates the relationship of the engine rotational speed and the throttle opening degree relative to the air flow quantity signal (the estimated value of the air flow quantity) in a predetermined form (the map data of FIG. 4). The memory of the microcomputer of the ECU 1 also includes a table storage part (table storage means) that stores "an engine rotational speed/engine shaft torque to air flow quantity characteristic table", which indicates the relationship of the engine rotational speed and the engine shaft torque relative to the air flow quantity signal (the estimated value of the air flow quantity) in a predetermined form (the map data of FIG. 5).

Each air flow quantity characteristic line indicated in FIGS. 4 and 5 indicates an air flow quantity characteristic (curve) of a median of the estimated air flow quantity range (i.e., a median between an upper limit value and a lower limit value of the estimated air flow quantity range), which can be estimated based on the engine load.

The air flow quantity estimating part 4 estimates the air flow quantity range based on the current engine load and outputs the estimated air flow quantity range to the air flow quantity determining part 5.

Specifically, the air flow quantity estimating part 4 estimates the air flow quantity range based on the engine rotational speed/throttle opening degree to air flow quantity characteristic table of FIG. 4 and outputs the estimated air flow quantity range to the air flow quantity determining part 5. Alternatively, the air flow quantity estimating part 4 estimates the air flow quantity range based on the engine rotational speed/engine shaft torque to air flow quantity characteristic table of FIG. 5 and outputs the estimated air flow quantity range to the air flow quantity determining part 5.

At the time of estimating the air flow quantity range, the median of the estimated air flow quantity range, which can be estimated based on the engine load, may be used as the air flow quantity signal (the estimated value of the air flow quantity) and is outputted to the air flow quantity determining part 5.

In the present embodiment, the air flow quantity sensing process and the air flow quantity estimating process are executed in this order. However, this order may be changed. For instance, the air flow quantity estimating process may be executed first, and then the air flow quantity sensing process may be executed next.

Next, the air flow quantity determining part 5 of the ECU 1 executes an air flow quantity determining process to determine the measurement value of the air flow meter 2.

First of all, it is determined whether the noise (EMI noise) in the pulse form, which is caused by, for example, the EMI, overlaps with the pulse frequency signal, which is outputted from the controller 22 of the air flow meter 2 (serving as a noise-overlapping determining means). Specifically, it is determined whether the sensed value of the air flow quantity, which is obtained by the air flow quantity sensing part 3, is out of (or within) the estimated air flow quantity range, which is estimated by the air flow quantity estimating part 4.

When the sensed value of the air flow quantity, which is obtained by the air flow quantity sensing part 3, is within the estimated air flow quantity range, the air flow quantity determining part 5 of the ECU 1 determines that the sensor output signal of the air flow meter 2 is the pulse frequency signal of the normal time (i.e., the normal pulse frequency signal) as indicated in FIG. 6A, and thereby the EMI noise does not overlap with the pulse frequency signal. At this time, the air flow quantity determining part 5 determines the sensed value of the air flow quantity, which is sensed by the air flow quantity sensing part 3, as the measurement value (current measurement value) of the air flow meter 2 and stores it in a measurement value storage part 20 of the memory of the ECU 1. In this instance, the measurement value storage part 20 serves as a measurement value (current measurement value) storage part, which functions as a measurement value (current measurement value) storage means.

In contrast, when the sensed value of the air flow quantity, which is obtained by the air flow quantity sensing part 3, is out of, i.e., is deviated from the estimated air flow quantity range, the air flow quantity determining part 5 of the ECU 1 determines that the sensor output signal of the air flow meter 2 is the pulse frequency signal of the abnormal time (i.e., the abnormal pulse frequency signal) as indicated in FIG. 6B, and thereby the EMI noise overlaps with the pulse frequency signal.

At this time, the air flow quantity determining part 5 sets a mask at an outside range, which is outside of the estimated air flow quantity range, and the air flow quantity determining part 5 does not use the sensed value of the air flow quantity, which is obtained at this masked period, as the measurement value (current measurement value) of the air flow meter 2.

Furthermore, after the setting of the mask at the outside range, which is outside of the estimated air flow quantity range, when the sensed value of the air flow quantity, which is obtained by the air flow quantity sensing part 3, falls in the masked range, the air flow quantity determining part 5 determines the median of the estimated air flow quantity range (the estimated value of the air flow quantity), which is obtained by the air flow quantity estimating part 4, as the measurement value (current measurement value) of the air flow meter 2 and stores it in the memory of the microcomputer. In this case, the measurement value storage part 20 of the memory of the microcomputer serves as the measurement value (current measurement value) storage part, which functions as the measurement value (current measurement value) storage means, to store the measurement value (current measurement value) of the air flow meter 2.

Alternatively, in the case where the sensed value of the air flow quantity is out of the estimated air flow quantity range, the previous measurement value of the air flow quantity may be determined as the measurement value (current measurement value) of the air flow meter 2 instead of using the sensed value of the air flow quantity, which is obtained by the air flow quantity sensing part 3, and may be stored in the measurement value storage part 20, which serves as the measurement value (current measurement value) storage part 20, as the measurement value (current measurement value) of the air flow meter 2. In this case, the measurement value storage part 20 of the memory of the microcomputer serves as the measurement value (previous measurement value) storage part, which functions as the measurement value (previous measurement value) storage means, to store the measurement value (current measurement value) of the air flow meter 2 as the previous measurement value of the air flow meter 2.

Furthermore, the amount of the intake air, which is supplied to the combustion chamber of each cylinder of the engine E does not suddenly change, so that the use of the previous measurement value as the current measurement value should not cause any substantial problem.

In the case where the sensed value of the air flow quantity is out of the estimated air flow quantity range, the upper limit value, the lower limit value or any value between the upper limit value and the lower limit value of the estimated air flow quantity range, which is obtained by the air flow quantity estimating part 4, may be determined as the measurement value (current measurement value) of the air flow meter 2 instead of using the median of the estimated air flow quantity range discussed above and may be stored in the memory of the microcomputer.

Then, the ECU 1 computes the fuel injection quantity, which is injected from the injector 21 into the intake port of the corresponding cylinder of the engine E, based on the measurement value (current measurement value) of the air flow meter 2, which is stored in the memory of the microcomputer. Then, the ECU 1 controls the injector drive electric current, which drives the injector 21 of the cylinder of the engine E, based on the computed fuel injection quantity.

Now, a comparative system (comparative example), which serves as an air flow quantity measurement apparatus (system) that measures an air flow quantity, will be discussed. In this comparative system, an ECU senses a period (duration of one cycle) of a pulse frequency signal outputted from the controller of the air flow meter and converts the sensed period of the pulse frequency signal into an air flow quantity signal (the sensed value of the air flow quantity).

Figure 7A:
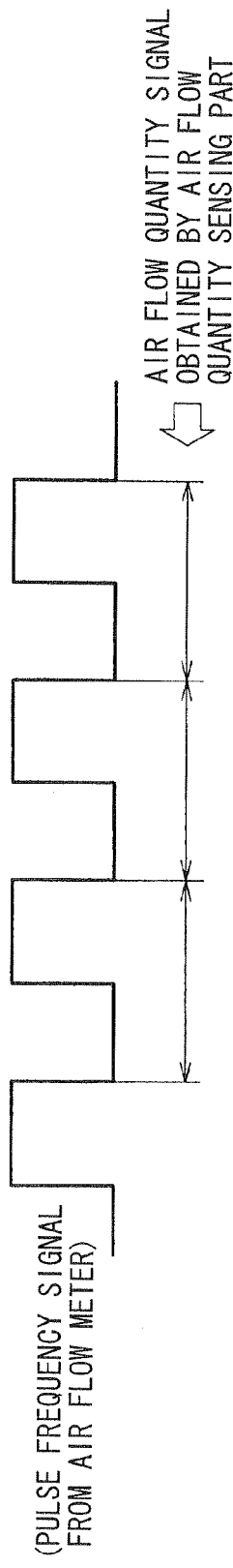
FIG. 7A is a timing chart showing a frequency signal of an air flow meter and an air flow quantity signal obtained by an air flow quantity sensing part during the normal time according to a comparative example.

With reference to FIG. 7A, in a case (normal time) where the EMI noise does not overlap with the pulse frequency signal, the system of the comparative example is not susceptible to an influence of fluctuations in a supply voltage supplied to the A/D converter circuit of the ECU, an influence of a voltage drop of a wire harness and an influence of fluctuations in a contact resistance of a connector in comparison to a system, which outputs a voltage signal of the air flow meter to the ECU, so that a sensing accuracy of the air flow quantity of the system is improved.

Figure 7B:
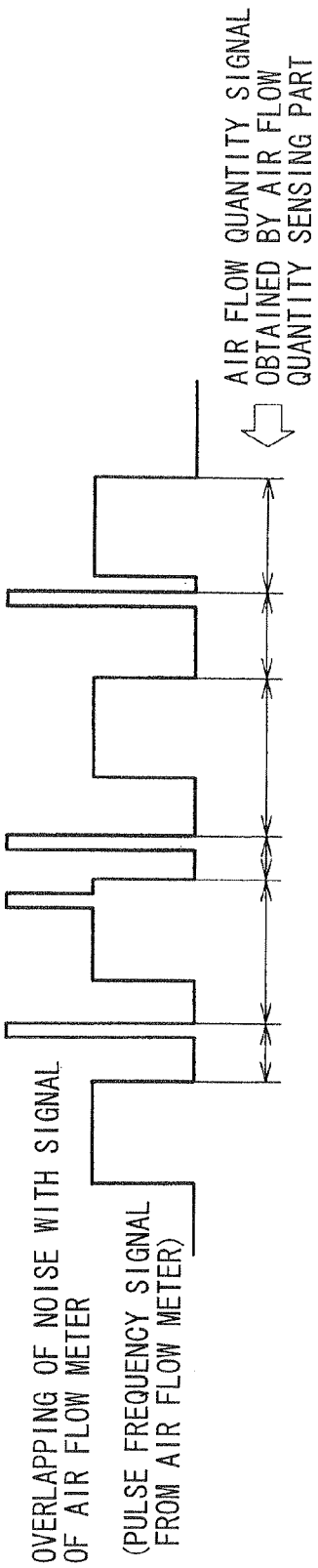
FIG. 7B is a timing chart showing a frequency signal of the air flow meter, and an air flow quantity signal obtained by the air flow quantity sensing part during the abnormal time according to the comparative example.
Figure 8B:
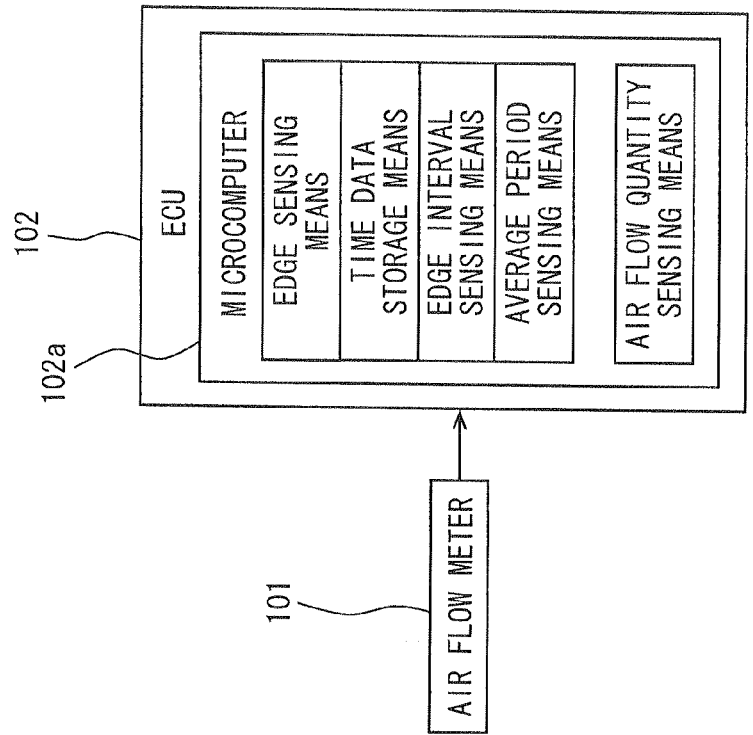
FIG. 8B is a block diagram showing a microcomputer of an ECU according to the prior art.
Figure 8A:
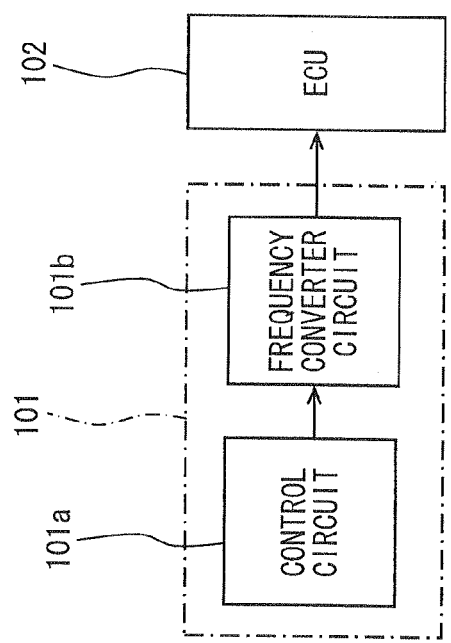
FIG. 8A is a block diagram sowing an air flow meter (a control circuit and a frequency converter circuit) of a prior art.

As shown in FIG. 7B, in the case (abnormal time) where the EMI noise overlaps with the pulse frequency signal, the system of the comparative example will erroneously compute the sensed value of the air flow quantity at the time of converting the pulse frequency signal into the air flow quantity signal (the sensed value of the air flow quantity). That is, in the case where the EMI noise overlaps with the pulse frequency signal, a sensing error of the sensed value of the air flow quantity becomes large. Thereby, in such a case, the accuracy and the reliability of the measurement value of the air flow meter (e.g., a value of the air flow quantity used in an engine control operation, such as a fuel injection control operation) are disadvantageously deteriorated.

Thus, in the air flow quantity measuring apparatus of the present embodiment, when the sensed value of the air flow quantity, which is obtained by the air flow quantity sensing part 3, is out of the estimated air flow quantity range, which is estimated by the air flow quantity estimating part 4, the median of the estimated air flow quantity range (the estimated value of the air flow quantity), which is obtained by the air flow quantity estimating part 4, is used as the measurement value of the air flow meter 2 (e.g., the value (current value) of the air flow quantity used in the engine control operation, such as the fuel injection operation). In this way, even when the EMI noise overlaps with the pulse frequency signal, it is possible to reduce the sensing error of the air flow quantity caused by the EMI noise.

Thereby, it is possible to improve the accuracy and the reliability of the measurement value of the air flow meter 2, which outputs the pulse frequency signal corresponding to the air flow quantity of the intake air passing through the intake pipe 6 of the engine E to the microcomputer (the air flow quantity sensing part 3) of the ECU 1.

Furthermore, the air flow quantity determining part 5 sets the mask at the outside range, which is outside of the estimated air flow quantity range, and does not use the sensed value of the air flow quantity, which is obtained at this masked period, as the measurement value (current measurement value) of the air flow meter 2.

Furthermore, after the setting of the mask at the outside range, which is outside of the estimated air flow quantity range, when the sensed value of the air flow quantity, which is obtained by the air flow quantity sensing part 3, falls in the masked range, the air flow quantity determining part 5 uses the median of the estimated air flow quantity range (the estimated value of the air flow quantity), which is obtained by the air flow quantity estimating part 4, as the measurement value (current measurement value) of the air flow meter 2.

Thereby, even in the case where the EMI noise overlaps with the pulse frequency signal, it is possible to reduce or minimize the sensing error of the air flow quantity caused by the EMI noise.

Now, modifications of the above embodiment will be described.

In the above embodiment, the air flow quantity sensing part 3 senses, i.e., receives the period (duration of one cycle) of the pulse frequency signal, which is outputted from the controller 22 of the air flow meter 2. Then, the air flow quantity sensing part 3 converts the sensed period of the pulse frequency signal into the sensed value of the air flow quantity, and the air flow quantity sensing part 3 outputs the sensed value of the air flow quantity to the air flow quantity determining part 5. Alternatively, the air flow quantity sensing part 3 may sense, i.e., receive the pulse frequency signal, which is outputted from the controller 22 of the air flow meter 2, and then the air flow quantity sensing part 3 may output the sensed pulse frequency signal to the air flow quantity determining part 5 as the sensed value of the air flow quantity.

In such a case, the air flow quantity determining part 5 senses, i.e., receives the period of the pulse frequency signal and converts the sensed period of the pulse frequency signal into the sensed value of the air flow quantity. Thereafter, the air flow quantity determining part 5 compares the estimated air flow quantity range, which is outputted from the air flow quantity estimating part 4, with the sensed value of the air flow quantity, which is obtained by the air flow quantity determining part 5.

In the above embodiment, the air flow meter 2 includes the flow quantity sensing unit 12a and the voltage-to-frequency converter 22b. Alternatively, the air flow meter 2 may include an air flow quantity sensing circuit and the voltage-to-frequency converter 22b.

In the above embodiment, the flow meter is the air flow meter 2, which can sense the flow quantity of the air and the flow direction of the air. Alternatively, the flow meter may be an air flow meter, which can sense only the flow quantity of the air.

That is, as long as the flow meter outputs the sensor output signal, which is the frequency signal in the pulse form, to the ECU 1, the structure, the circuit construction and the installation location of the flow meter are not limited to those discussed in the above embodiment and may be modified freely.

Additional advantages and modifications will readily occur to those skilled in the art. The invention in its broader terms is therefore not limited to the specific details, representative apparatus, and illustrative examples shown and described.

What is claimed is:

1. An air flow quantity measuring apparatus for an internal combustion engine, comprising:
    an air flow meter that outputs a frequency signal, which corresponds to an air flow quantity of intake air to be supplied to the internal combustion engine;
    an air flow quantity sensing part that senses the frequency signal and outputs a sensed value of the air flow quantity based on the frequency signal;
    an air flow quantity estimating part that estimates an air flow quantity range based on an operational state of the internal combustion engine and outputs an estimated value of the air flow quantity, which is within the estimated air flow quantity range; and
    an air flow quantity determining part that determines a measurement value of the air flow meter, wherein:
        the air flow quantity determining part determines that an external noise does not overlap with the frequency signal of the air flow meter and thereby determines the sensed value of the air flow quantity as the measurement value of the air flow meter when the sensed value of the air flow quantity is within the estimated air flow quantity range;
        the air flow quantity determining part determines that the external noise overlaps with the frequency signal of the air flow meter and thereby determines that the estimated value of the air flow quantity as the measurement value of the air flow meter when the sensed value of the air flow quantity is out of the estimated air flow quantity range;
        the air flow quantity determining part sets a mask at an outside range, which is outside of the estimated air flow quantity range; and
        the air flow quantity determining part does not use the sensed value of the air flow quantity as the measurement value of the air flow meter during a masked time period, during which the outside range, which is outside of the estimated air flow quantity range, is masked with the mask.

2. The air flow quantity measuring apparatus according to claim 1, wherein the air flow meter includes:
    an air flow quantity sensing unit that senses the air flow quantity and outputs a corresponding electrical signal; and
    a frequency converter that converts the electrical signal, which is outputted from the air flow quantity sensing unit, into the frequency signal and outputs the frequency signal.

3. The air flow quantity measuring apparatus according to claim 1, wherein:
    the air flow quantity sensing part senses a period of the frequency signal; and
    the air flow quantity sensing part converts the period of the frequency signal into the sensed value of the air flow quantity and outputs the sensed value of the air flow quantity.

4. The air flow quantity measuring apparatus according to claim 1, wherein the estimated air flow quantity range, which is estimated by the air flow quantity estimating part based on the operational state of the internal combustion engine, is estimated based on a load of the internal combustion engine.

5. The air flow quantity measuring apparatus according to claim 1, wherein the air flow quantity determining part uses the estimated value of the air flow quantity as the measurement value of the air flow meter instead of the sensed value of the air flow quantity when the sensed value of the air flow quantity is outside of the estimated air flow quantity range.

6. The air flow quantity measuring apparatus according to claim 1, wherein:
- the air flow quantity determining part sets a mask at an outside range, which is outside of the estimated air flow quantity range; and
- the air flow quantity determining part uses a median of the estimated air flow quantity range as the measurement value of the air flow meter when the sensed value of the air flow quantity falls in the outside range, which is masked with the mask.

7. The air flow quantity measuring apparatus according to claim 1, further comprising a measurement value storage part that stores the measurement value of the air flow meter as a previous value of the air flow quantity, wherein:
- the air flow quantity determining part sets a mask at an outside range, which is outside of the estimated air flow quantity range; and
- the air flow quantity determining part uses the previous value of the air flow quantity as the measurement value of the air flow meter when the sensed value of the air flow quantity falls in the outside range, which is masked with the mask.

* * * * *